United States Patent [19]

Schoch

[11] Patent Number: 5,094,107
[45] Date of Patent: Mar. 10, 1992

[54] PRESS VIBRATION SEVERITY/RELIABILITY MONITORING SYSTEM AND METHOD

[75] Inventor: Daniel A. Schoch, Minster, Ohio
[73] Assignee: The Minster Machine Company, Minster, Ohio
[21] Appl. No.: 570,343
[22] Filed: Aug. 21, 1990
[51] Int. Cl.$^5$ ............................................. G01N 29/00
[52] U.S. Cl. .................................... 73/570; 73/862.06
[58] Field of Search ............... 73/570, 862.41, 862.06; 340/680, 683; 100/99; 364/508, 551.02, 551.01

[56] References Cited

U.S. PATENT DOCUMENTS

| | | | |
|---|---|---|---|
| Re. 30,298 | 6/1980 | Keller | 340/680 |
| 3,819,916 | 6/1974 | Watanabe | 235/151.11 |
| 4,023,044 | 5/1977 | Miller et al. | 307/116 |
| 4,116,050 | 9/1978 | Tanshashi et al. | 73/88.5 |
| 4,184,205 | 1/1980 | Morrow | 264/508 |
| 4,408,285 | 10/1983 | Sisson et al. | 364/508 |
| 4,520,674 | 6/1985 | Canada et al. | 73/660 |
| 4,612,620 | 9/1986 | Davis et al. | 73/570 |
| 4,683,542 | 7/1987 | Taniguti | 364/508 |
| 4,885,707 | 12/1989 | Nichol et al. | 364/551.01 |
| 4,980,844 | 12/1990 | Demjanenko et al. | 364/551.02 |

OTHER PUBLICATIONS

"Press Management Automation: An Innovation for Quality Improvement" by Robert Carabbio, 1989.

Primary Examiner—Hezron E. Williams
Assistant Examiner—Louis M. Arana
Attorney, Agent, or Firm—Baker & Daniels

[57] ABSTRACT

A method of generating a press load/speed vibration severity capacity zone chart, for the purpose of determining the effects of any press/die application on the long-term operating reliability of a press during its production operation, wherein sensors are placed on the press structure to monitor and record RMS vibration velocity levels over a plurality of load/speed test condition combinations, in order to generate the reliability chart. Further apparatus is used to monitor the actual reliability level of the press during any production application, by comparison of the actual production operation data to the data generated by the method to establish the press vibration severity/reliability chart.

29 Claims, 5 Drawing Sheets

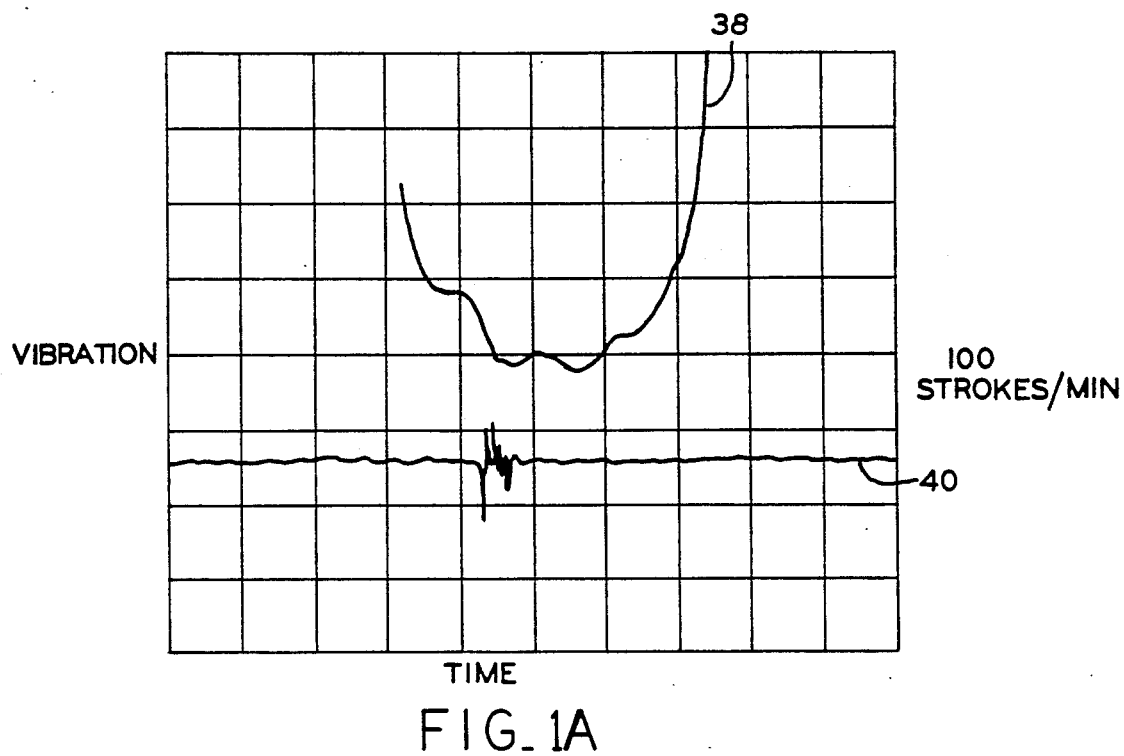
FIG_1A
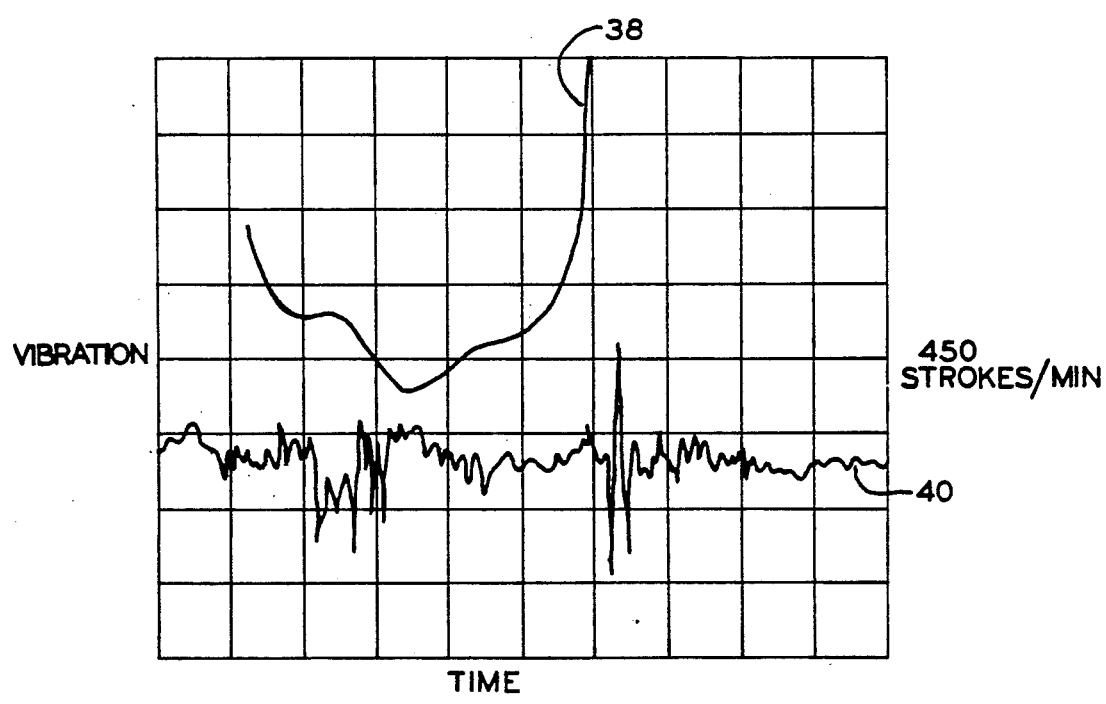
FIG_1B

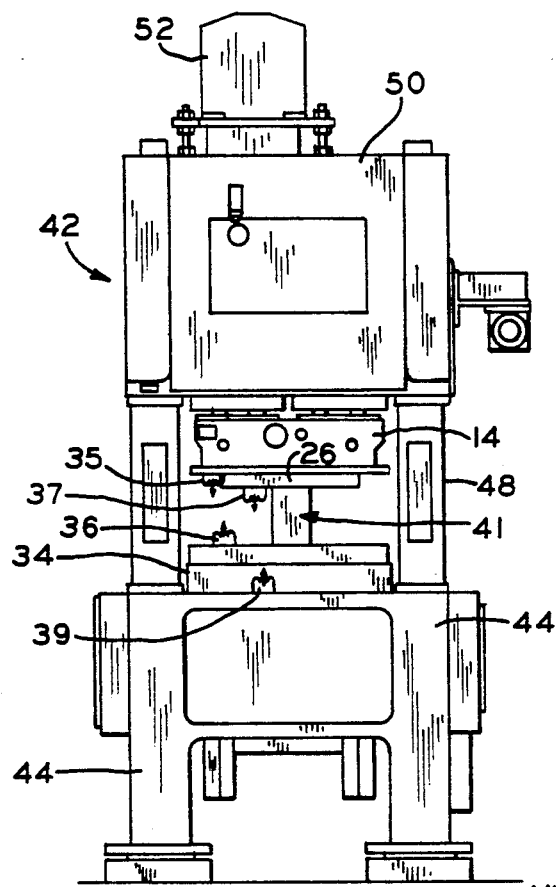
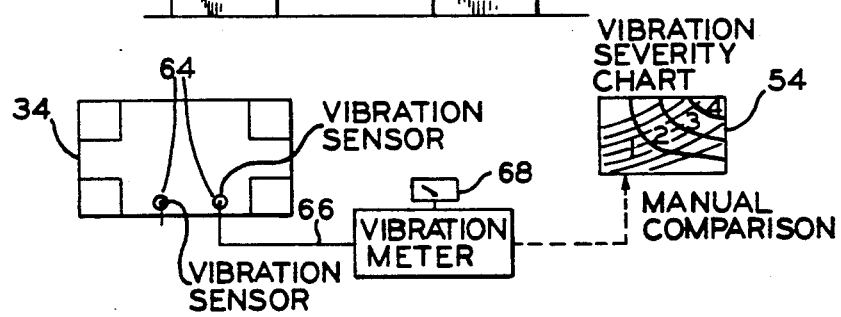
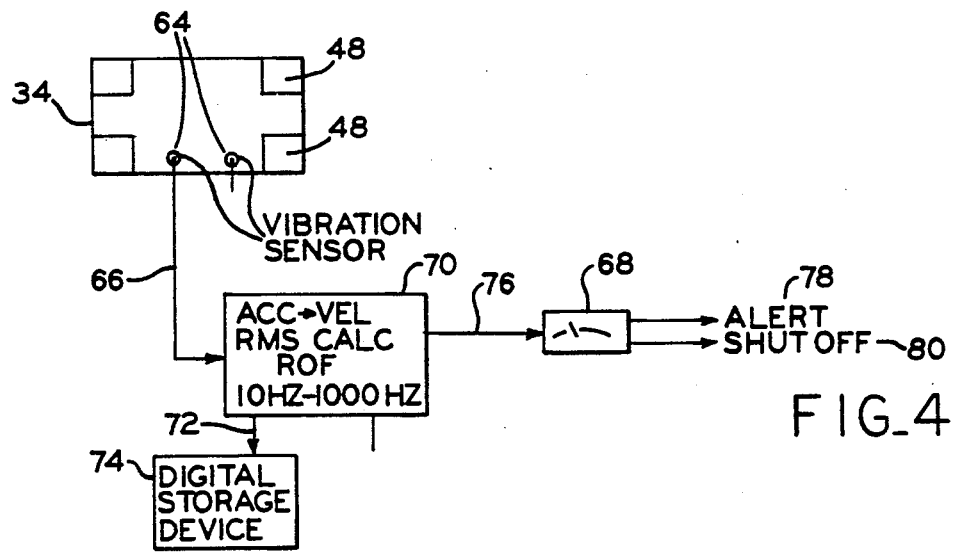
FIG_2
FIG_3
FIG_4

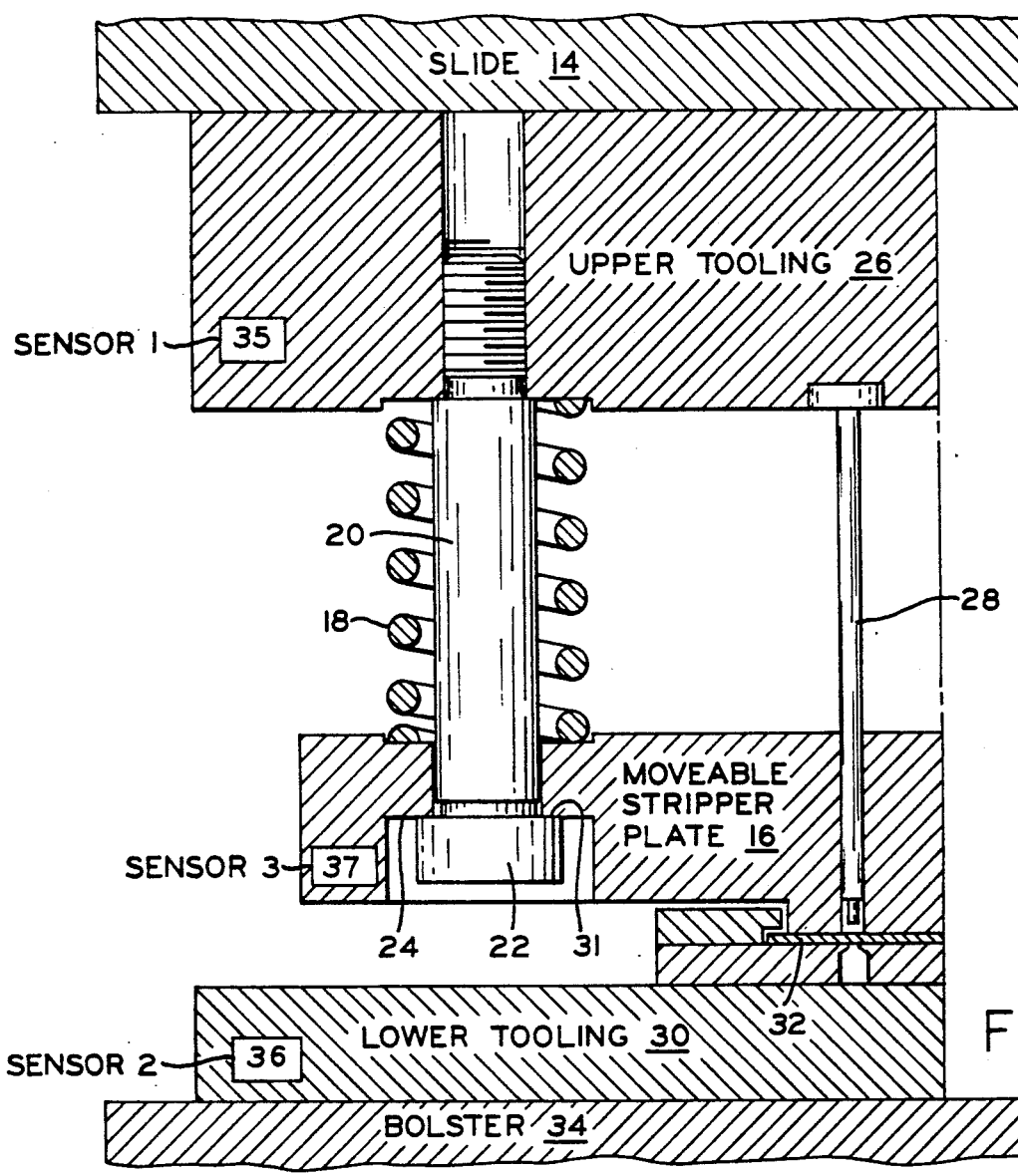
FIG._7
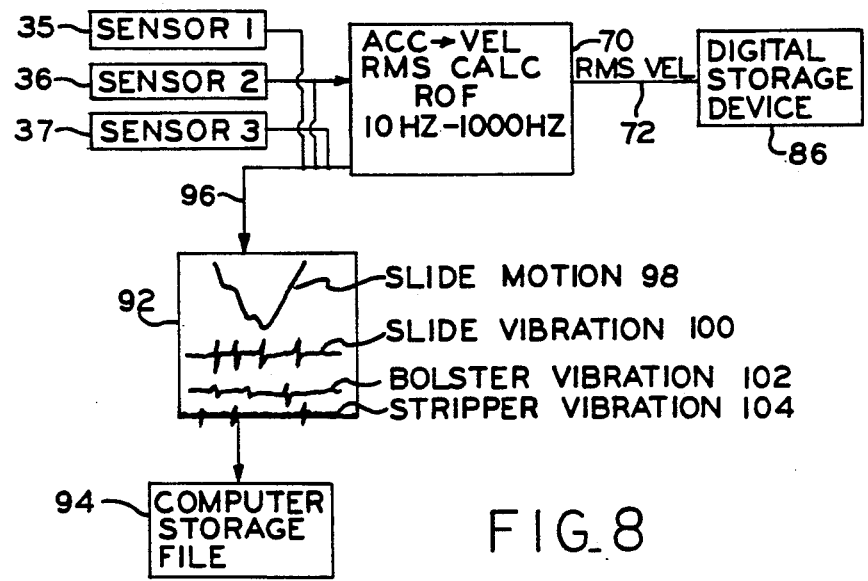
FIG_8

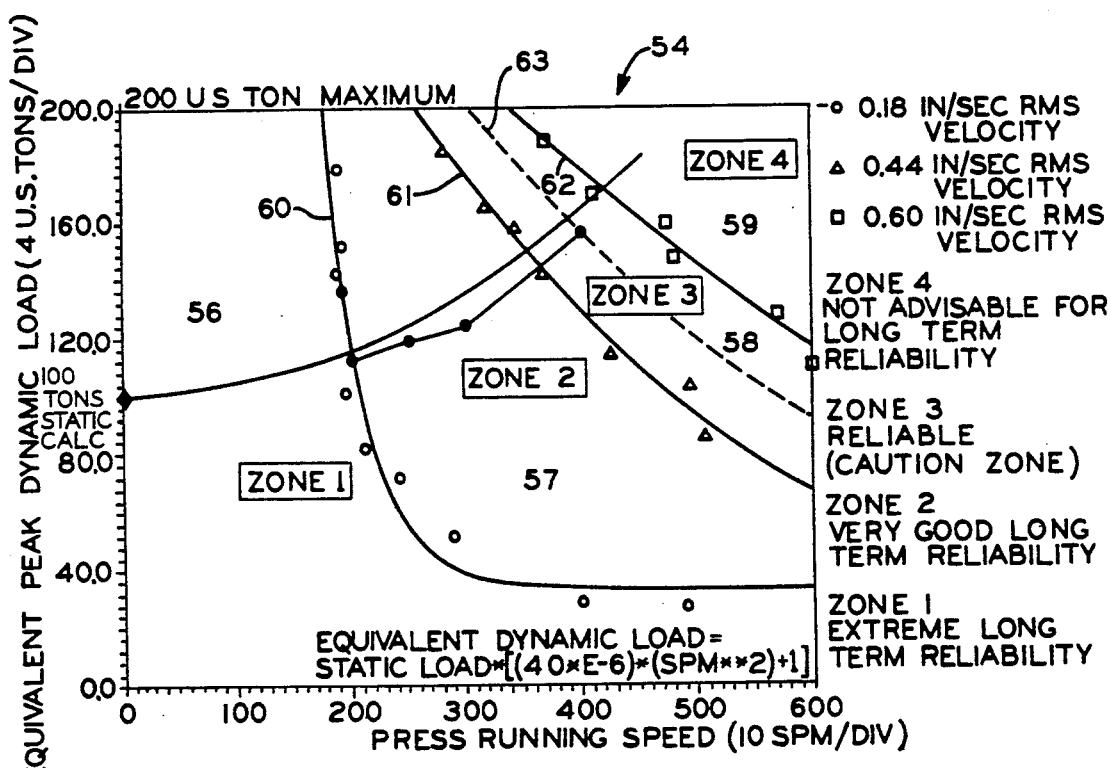
FIG_9

PRESS VIBRATION SEVERITY/RELIABILITY MONITORING SYSTEM AND METHOD

BACKGROUND OF THE INVENTION

The present invention relates generally to press vibration monitoring and, more particularly, to a method of generating a press load/speed vibration severity capacity zone chart for the determination of press/die long-term operating reliability during production operation and to an apparatus utilizing the information generated by the above method in monitoring press vibration severity.

The traditional, state of the art method for calculating the tonnage of the die is mainly by a means of static load calculation. A given die has a certain material shear length and a stock material with a certain thickness. From this, the tonnage of the die or the force necessary to shear or form the part may be calculated. Traditional press sizing has been based on "static" die shear loading as calculated using the equation;

[Shear Length (in.)][Thickness (in.)][$S_s$ (lb/in$^2$)] = Shear Load (lb).

This load (plus forming and blanking static loads) have traditionally been considered the only significant load and thus the peak dynamic load of the press. Generally, on shorter stroke machines at speeds below 300 strokes per minute, dynamic effects are not a major influence on die application severity. As press speeds are increased, however, there are several other dynamic influences which become present, thereby creating additional press loadings in addition to increases produced by the actual shear loading above the traditional static calculated value. In many cases, these dynamic loads surpass the shear load as the peak dynamic load. In addition to greater effective shear loads, additional impact forces are created as press speed increases, which further contributes to the vibration of the press structure.

It has been found through experimentation that as the press speed increases there are many additional loads that occur that are not present at slower press speeds. There are actually several different sources of additional die load parameters that many press owners do not know exist. At higher speeds, even though not exceeding the capacity of the press, the press requires more force to make the part, which in turn creates a different set of more severe vibration conditions.

At higher press speed, in the press structure, the loads are applied much more quickly, are released more quickly, and in general are producing a much stronger shock wave which is sent through the press structure. By increasing the speed of the press, the velocity at any given point above bottom dead center is increased, thereby increasing the impact forces of the punches on the stock material. These impact forces are related to the square of the velocity. Therefore, press speed is one of several factors increasing vibration in the press. By running the press at higher speeds more severe vibration is transmitted through the press.

A second factor contributing to press vibration is the stroke length, which increases the impact forces and loading on the press. A third factor is the contact distance of the die punches and stripper plate above bottom dead center. The higher these components contact above bottom dead center, the greater the impact velocity and, therefore, the more severe the vibration level.

Additionally, as the strain rate of the stock material is increased, which happens normally when press speed increases, the shearing properties of the stock material change. The effective shear strength of the stock material increases significantly and actually starts to approach the ultimate strength of the stock material. As the dynamic loads are developed more quickly and/or as the speed of the machine increases, the yield strength of the stock material increases as the strain rate increases. In the static situation or in a slow strain rate test such as ASTM-type test, the normal ratio of yield point strength to ultimate strength would be approximately 55%. But as press speeds are increased the ratio of yield point strength to ultimate strength can increase to 80% to 85% or above. Therefore, even though the strength of the stock material has not changed, the effective shear strength of the stock material, (and yield point strength of the stock material) has effectively increased under high strain rate conditions. This again increases the loading on the press thereby causing more severe vibration.

Additionally, many dies in presses have a movable stripper that normally leads the punches, which further causes a third and fourth vibration factor. The higher above the bottom of stroke or bottom dead center (BDC) that the movable stripper plate contacts the stock material, the greater the impact effects, thus called "downward stripper impact", which further causes more press vibration. FIG. 7 depicts during press punching operation, a slide 14 and stripper plate 16 between which are connected springs 18 connected by stripper bolts 20 Bolt head 22 is in a recess 24 of the stripper plate 16. The stripper plate 16 is connected to the upper tooling 26 having multiple punches 28. Lower tooling 30, having multiple dies to punch the stock material or workpiece 32, is attached to the bolster 34 directly under the lower tooling 30. Attached to slide 14, bolster 34 and stripper plate 16 are vibration sensors 35, 36 and 37, respectively, any or all of which can be used to monitor the vibration condition of the press/die application. As the slide moves downward, the slide and stripper plate will move together as one unit until the stripper plate contacts the upper surface of the material. At that point the stripper plate does not travel any further downward but the slide and the stripper bolts continue downward compressing the spring. The higher off the bottom of stroke that contact occurs or the faster the press is running, the greater the impact force that will be created.

On the press upstroke, the slide and stripper bolts will have the same velocity. At the contact point 31 on the stripper plate 16, the mass of the stripper plate, which is at zero velocity until "upstroke impact", is accelerated to the velocity of the slide and stripper bolts instantaneously. Again an increase in press speed or increase in contact distance above BDC causes a greater impact velocity at the point at which the stripper bolts make contact with the stripper plate, thereby increasing the vibration from impact.

Another factor relative to press vibration increase is the stored energy release during the manufacture of the part. Deflections will occur on the press structure during loading of the die. As the stock material fractures through, called the snap through, the release of the stored deflection energy sends a vibration shock wave through the press structure. The released stored energy also has the ability to accelerate the slide downward, which can cause the die punches to penetrate the stock material more deeply. As the applied load increases, so does the stress and deflection levels within the press structure, therefore, causing increased energy release and increased vibration.

Another factor which affects the press structure and vibration is the use of flattening stations or stop blocks. If these devices are utilized in the die, then additional loads and impact forces are present. As press speed increases the press shutheight will naturally close in, which, if stop blocks are utilized, will cause a larger load to be applied. The press shutheight naturally closes in as press speed increases due to the inertia forces developed.

Still another factor is the thermal shutheight effect. Again, as speed is increased, there is a viscous shear of the oil within the press crankshaft bearing clearances. The heat generated from the shear of the oil is conducted through the press structure and drive connections, causing the shutheight to dimensionally close in more deeply.

Thus, the above described dynamic effects that occur during press operation increase the loading and overall vibration levels induced in the press structure, all of which increase with an increase in press speed. FIGS. 1A and 1B depict oscilloscope graphs of a press running at 100 strokes per minute and 450 strokes per minute showing press slide vertical motion 38 and its corresponding induced press vibration 40 as detected by an accelerometer 35, 36 or 37.

Vibration stress magnifications created by dynamic load increase, can cause many problems to press structures. Cracks can develop over time in the castings anywhere within the press structure or its parts if long term dynamic load increases are unknown or go ignored. Broken parts such as tie rods, crankshafts, crowns, slides and dynamic balancers have been reported, and in all instances have been able to be correlated by field service data to specific threshold vibration levels measured on the press structure during production. At certain definable vibration severity levels, stress magnification levels will be present thus creating increased maintenance severity problems for the press.

The relative life of a press is thus determinable from the accumulative effects of the vibration severity levels experienced over this period of time. A press may withstand high vibration levels without major structural damage if the duration period is relatively short. Also, a press will certainly withstand low vibration levels without structural damage no matter what the duration period. Accumulative structural damage will occur, however, when a press is run in a stressed condition as a result of medium to high vibration severity levels over a longer duration period whether run continuously or intermittently. The damage will not necessarily be evident in the early stages but will begin to appear over time.

Vibration monitoring systems of the prior art shut down the press at an individual predetermined level which when reached, would begin to cause damage to the press. The present invention measures vibration while in actual production and allows the press operator, tooling engineer, and/or production manager to know the long term reliability effects of running the press at any combination of sensed speed and load, by monitoring the actual vibration severity level of the die application, and comparing the corresponding operating vibration severity level to the produced vibration severity zone chart either manually or electronically.

The present invention advises of the predicted level of vibration severity and reliability for any application run at any speed. Previous preventive maintenance vibration monitoring only monitors no load changes to the base reference level, attained through no load reference level analysis. The previous prior art preventive maintenance vibration level measured under no load conditions do not accurately reflect actual production vibration conditions, as does the present vibration monitoring system.

Thus, for reliable long-term press production operation, a particular press must be operated within zones of safe load/speed dynamic combinations which will cause acceptable levels of press vibration severity. Each press has certain inherent characteristics which allow it to be safely operated with long term reliability within a range of production speeds and dynamic load combinations.

SUMMARY OF THE INVENTION

Generally, the present invention provides a method and apparatus for the identification of dynamic press load/speed vibration severity capacity and for the determination of press/die long-term operating reliability during production operation for presses of a given design.

More specifically, the process of the present invention determines zones for press operating reliability generated by the use of accelerometer sensors and load cells under various operating condition load/speed combinations which thus establishes the data for the inventive apparatus used to monitor and report vibration severity zones during press production operation.

Every manufactured press series has individual design characteristics which, when the process according to the present invention is utilized, generates a unique vibration severity/reliability zone chart. Three components are monitored in order to generate a press vibration severity/reliability zone chart, namely, dynamic load, press speed, and vibration RMS (root mean squared) velocity level. In particular, accelerometer sensors are attached to various major press components such as the uprights, bed, slide or other major structural members to monitor RMS vibration velocity while dynamic load cells in the shutheight area monitor load. The press is operated over various conditions of load and speed combinations and the resultant vibration severity levels are measured which are gathered and plotted on a load versus speed graph. Curves are then drawn between points of constant RMS vibration velocity corresponding to 0.18, 0.44, 0.50, 0.55 and 0.60 inches per second RMS vibration velocity, for example, thereby defining four or more vibration severity zones for press reliability. Other vibration levels are also selected, but these levels have been found to be most useful when correlated to part failure instances in establishing a workable press vibration severity/reliability operating chart.

The zones thus established relate the press RMS velocity vibration severity level to the potential long-term operating reliability for the particular press as follows:

Zone 1 Extreme Long-Term Reliability
Zone 2 Very Good Long-Term Reliability
Zone 3 Reliable (With Caution)
Zone 4 Not Advisable For Long-Term Reliability During actual press production operation, RMS velocity vibration is monitored, processed and displayed. Sensors, which may be accelerometers, are placed on various locations of the press. A vibration meter monitors the vibration levels using standard purchased vibration equipment which can be manually compared to the generated zone chart. Another embodiment utilizes a calibrated standard electrical circuit which converts acceleration to an RMS velocity measurement within a rolloff frequency range of 10 to 1000 Hertz. Included in the circuitry could be a discrete digital storage device that would store the times and durations that zone 4 press vibration levels have occurred. Several different types of vibration meters could also be utilized visually showing the demarcated zones. Attached to the circuitry could be an alert signal and/or automatic shut off means. Also, a computer or internal digital storage device may be utilized to historically store vibration data created by all dies operated in the press or which would visually show on a computer screen the dynamic vibration levels occurring in the press.

A plurality of presses, alternatively, may be monitored using the various embodiments described above by multiplexing sensor signals from the presses which are displayed on a computer screen using developed vibration monitoring software.

A unique press vibration severity/reliability zone chart is generated by operating a press through a plurality of continuously recurring cycles, monitoring and then recording the speed, exerted load, and the magnitude of induced vibrations utilizing vibration sensors attached to various locations on the press. The vibration magnitude is plotted on a load versus speed graph, defining curves of equal vibration magnitudes which divides the graph into a plurality of zones. The cycle is repeated, varying the speed and load combinations applied to the press.

A press is monitored during production utilizing the following apparatus with reference to the generated zone chart. Calibrated vibration sensors are attached to various press locations which send electrical signals to a meter or other readable device and a discrete storage device. Alternatively, a computer may be utilized, monitoring several presses at once.

The advantage of the present invention over the prior art is to allow the press owner to predict and determine the long term reliability effects of vibration being created during dynamic operation under various operating conditions such as speed and dynamic loading.

Another advantage is to allow the user to store and retrieve cumulative vibration severity data for die design and maintenance purposes from presses while in actual production operation.

Prior art preventive maintenance systems (used on lathes, mills, etc.) utilize RMS velocity monitoring methods in providing data for preventive maintenance programs. These methods compare a no load "new machine" base reference level to no load, non-production levels taken at periodic intervals over the life of the machine tool. This method does not take into account different applications, loads, or press speeds. In addition, the signal derived from this method does not fully monitor the vibration levels while in operation. In advantageous contrast to the prior art methods, the present invention provides a dynamic monitoring system which advises the user of predicted levels of press vibration severity and resulting reliability for any application run at any speed. This provides more accurate data not only for preventive and routine maintenance, but also provides knowledge of the effects being produced by press applications.

The present invention overcomes many prior art shortcomings by establishing a unique vibration severity/reliability zone chart for each type or model of manufactured press. This data is then used to guide the user in operating the press safely and under production conditions which promotes press and die longevity. This data can also be used to guide the user to selection of proper new presses for planned future production applications.

BRIEF DESCRIPTION OF THE DRAWINGS

The above mentioned and other features and objects of this invention, and the manner of attaining them, will become more apparent, and the invention itself will be better understood by reference to the following description of embodiments of the invention taken in conjunction with the accompanying drawings, wherein:

FIGS. 1A and 1B depict oscilloscope graphs of the press slide vertical motion and the resultant induced vibration levels over time for a press operating at 100 strokes per minute and 450 strokes per minute respectively.

FIG. 2 is an elevational view of a typical press which is the subject of vibration severity monitoring.

FIGS. 3, 4, 5 and 6 are schematic representations of respective embodiments of the vibration analysis apparatus.

FIG. 7 is an enlarged sectional view of a portion of a press with sensors placed in various locations for monitoring press structural vibration.

FIG. 8 is a schematic representation of an embodiment of the apparatus used to monitor the sensor configuration of FIG. 7.

FIG. 9 depicts an empirically generated press vibration severity/reliability zone chart according to the present invention.

Corresponding reference characters indicate corresponding parts throughout the several views. The exemplifications set out herein illustrate the preferred embodiments of the invention and such exemplifications are not to be construed as limiting the scope of the invention in any manner.

DESCRIPTION OF THE PREFERRED EMBODIMENTS

Figure 5:
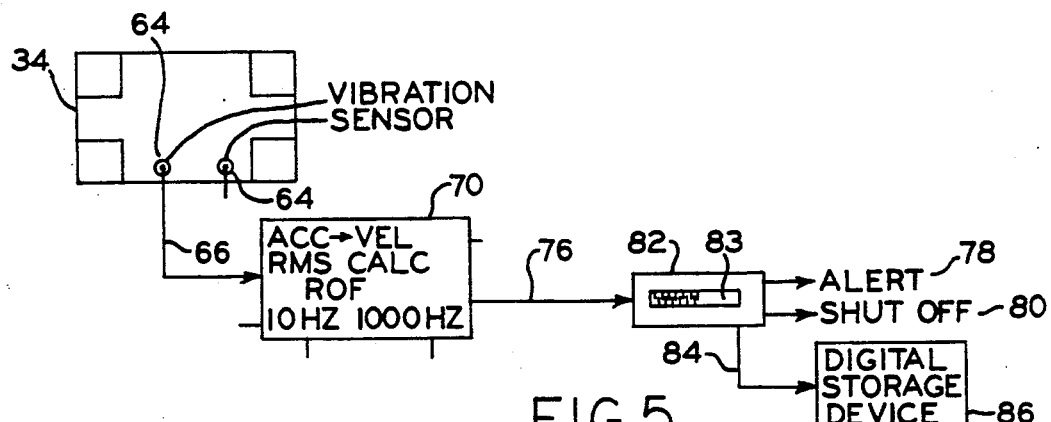

Referring to FIG. 2, there is depicted a typical press 42 having a bed 44 with bolster 34. Attached vertically to the bed 4 are uprights 48 supporting a crown 50 below which is slide 14 carrying tooling 26. Above crown 50 and attached thereto is press motor 52.

FIG. 9 shows the Load/Speed Vibration Severity/Reliability zone chart 54 generated by the process of the present invention, which is the fingerprint of the press by which the operating reliability is to be measured. Vibration sensors 35, 36, 37 and 9 (FIG. 2) are attached to several locations, or one sensor attached to only one location, on the press along with dynamic load cell 41. The press is then run over varying conditions of load and speed to generate data which is plotted on a speed versus load graph 54 to produce a vibration severity/reliability zone chart. By utilizing the data obtained from vibration sensor(s) 35, 36, 37 and 39, and load cell 41 run under various speed and load conditions, the zone chart 54 is divided into four major operating zones of press reliability, Zone 1 (56), Zone 2 (57), Zone 3 (58) and Zone 4 (59) corresponding to extreme long-term reliability, very good reliability, reliable with caution, and not advisable for long-term reliability, respectively, developed by curves of equal RMS vibration velocity 60, 61 and 62 corresponding to 0.18 in/sec RMS velocity, 0.44 in/sec RMS velocity, and 0.60 in/sec RMS velocity, respectively. A recommended maximum level for reliable operation is shown as dashed curve 63 and corresponds to 0.50 in/sec RMS velocity.

During press operation, vibration is monitored by the apparatus according to the following embodiments of the invention. In one embodiment thereof, referring to FIG. 3, the vibration sensor 64 is attached to the press bolster 34 and connected by electrical lead 66 to a vibration meter 68. The meter 68 is visually checked against the empirically generated vibration severity/reliability zone chart 54 by the operator or production manager to determine the operating Zone 1 (56), Zone 2 (57), Zone 3 (58) or Zone 4 (59) in which the press/die application is currently being operated.

In another embodiment according to the present invention, referring to FIG. 4, vibration sensor 64 is attached to the press bolster (or other equivalent major structural member of the press) 34 and connected by electrical lead 66 to calibrated standard electrical circuitry 70 which converts the electrical signals produced by vibration sensor 64 acceleration to an RMS velocity with a rolloff frequency in the ISO measurement range of 10 to 1000 Hertz (although, other frequency ranges could be used). The calibrated circuitry 70 is connected via electrical lead 72 to a discrete digital storage device 74 for digitally storing the vibration severity data. The calibrated circuitry 70 is also connected to meter 68 by electrical lead 76 to allow the operator a visual check of the press vibration severity being generated by the current die application, to compare to the previously generated vibration severity/reliability zone chart 54. Alert signal 78 from meter 68 may be connected to a visual or audible alarm to warn the operator when the vibration severity in press 42 has reached a predetermined vibration severity or reliability zone level. Press shutoff signal 80 may be used to shut off press 42 when vibration severity reaches a predetermined level.

In another embodiment according to the present invention, referring to FIG. 5, vibration sensor 64 is attached to the press bolster 34 and connected by electrical lead 66 to calibrated standard electrical circuitry 70 which converts the electrical signal produced by vibration sensor 64 acceleration to an RMS velocity with a rolloff frequency in the optional range of 10 to 1000 Hertz. Calibrated circuitry 70 is connected via electrical lead 76 to meter 82, which has a display 83 that is zoned according to the generated vibration severity/reliability zone chart of the present process invention, for example by color or cursor lines, for easy visual sighting of press vibration severity. Zoned meter 82 digitally transmits information via electrical lead 84 to a discrete digital storage device 86 for later use. Alert signal 78 from meter 82 may be connected to a visual or audible alarm to warn the operator when vibration in press 42 has reached a predetermined reliability zone level. Press shutoff signal 80 may be used to shut off press 42 when vibration severity reaches a predetermined level.

Figure 6:
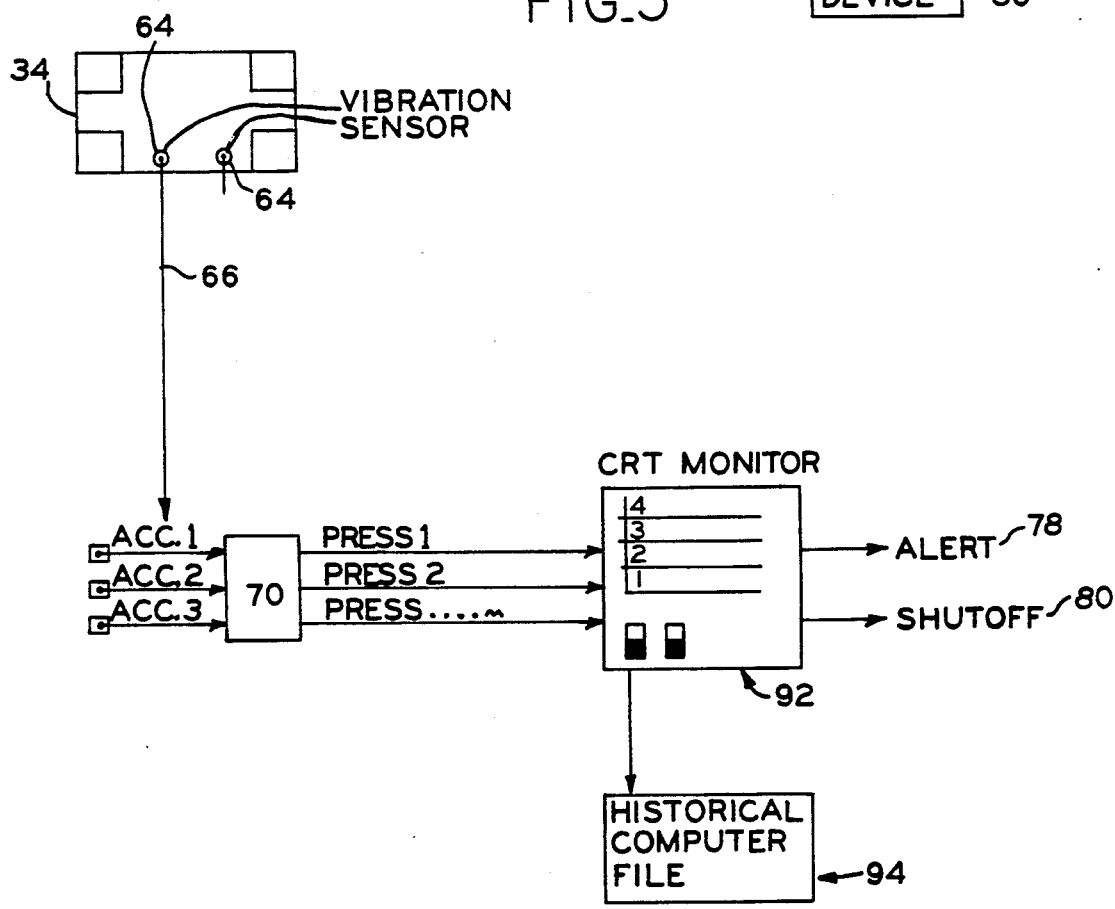

In order that several presses may be monitored by a central processing unit, FIG. 6 shows an alternative embodiment of the vibration severity/reliability monitoring apparatus. Vibration sensor 64 is attached to the press bolster 34, or several sensors attached to various parts (not shown), and connected by electrical lead 66 to calibrated standard electrical circuitry 70 which converts the electrical signals produced by vibration sensor 64, or signals from all sensors each from a different press (not shown), acceleration to an RMS velocity. Calibrated circuitry 70 transmits the data into a computer and CRT monitor 92 to graphically show the vibration severity patterns for each press. In addition, the data could further be stored in a computer file 94.

FIG. 8 depicts the slide, bolster and stripper plate sensors 35, 36 and 37, respectively, according to the configuration of FIG. 7. One or all of the signals generated thereby are connected to calibrated standard electrical circuitry 70 for conversion into an RMS velocity. Electrical lead 72 transmits one or all of the RMS velocity signals to a digital storage device 86. Electrical lead 96 transmits the raw acceleration signals to computer and CRT monitor 92 to display the slide motion 98, slide vibration 100, bolster vibration 102 and stripper vibration 104 over time which can be stored in computer storage file 94 via commercially available software.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating, for a particular press, a unique press vibration severity/reliability zone chart comprising:
   running a press through a plurality of continuously recurring cycles;
   monitoring and recording the speed of the press;
   monitoring and recording the load exerted by the press;
   monitoring and recording vibration severity magnitude velocity induced in the press utilizing vibration sensor means attached to the press;
   on a load versus speed graph, plotting the recorded vibration severity magnitude; then
   varying the speed and load of the press and repeating the previous steps until a plurality of vibration magnitudes are recorded; and
   on said graph, defining curves of equal vibration severity magnitudes to divide the graph into a plurality of zones representing differing vibration magnitudes.

2. The method of claim 1 wherein said vibration sensor means is an accelerometer.

3. The method of claim 1 wherein at least three curves of equivalent vibration magnitudes are plotted over varying speed and load conditions.

4. The method of claim 1 wherein said curves defining said zones represent 0.18 in/sec RMS, 0.44 in/sec RMS and 0.60 in/sec RMS vibration velocity.

5. The method of claim 1 wherein a plurality of vibration magnitudes are plotted over varying speed and load conditions.

6. The method of claim 1 wherein said graph is divided into four zones.

7. The method of claim 5 wherein said zones represent press operating reliability levels.

8. The method of claim 7, in which the zones of reliability are generated by lines of equivalent vibration level measurements, which are further defined by establishment of equations of curve fit for the equivalent vibration data.

9. The method of claim 8, in which reference dynamic load increase curves are defined by equations of curve fit from actual cases of dynamic load/speed applications, yielding guidelines of escalation of the vibration severity from dynamic load effects for proposed future press/die applications.

10. A method of monitoring vibration severity levels in a press comprising:
   running a press through a plurality of continuously recurring cycles;
   monitoring and recording the speed of the press;
   monitoring and recording vibration severity magnitude velocity induced in the press utilized vibration sensor means attached to the press;
   on a load verses speed graph, plotting the recorded vibration severity magnitude; then
   varying the speed and load of the press and repeating the previous steps until a plurality of vibration magnitudes are recorded;
   on said graph, defining curves of equal vibration severity magnitudes to divide the graph into a plurality of zones representing differing vibration magnitudes;
   providing a display connected to the sensor means to display vibration magnitude;
   operating the press in a production mode; and
   manually comparing the display reading to said graph.

11. The method of claim 10 wherein said vibration sensor means is an accelerometer.

12. The method of claim 10 wherein said vibration sensor means are a plurality of accelerometers.

13. An apparatus for monitoring the long-term reliability condition of a running press, the press being operable over a range of load, speed, and die conditions and parameters, the apparatus comprising:
   vibration sensor means, attached to said presses, for generating first electrical output signals;
   calibrated electrical circuitry, responsive to and converting said first electrical output signals into second electrical output signals within a frequency range of 10 to 1000 hertz;
   means for displaying said second output signals as being within one of a plurality of pregenerated equivalent vibration level operating zones indicating the long term reliability condition of the press; and
   discrete digital storage means responsive to said second electrical output signals for accumulating vibration data.

14. The apparatus of claim 13 wherein said vibration sensor means are accelerometers.

15. The apparatus of claim 13 wherein said display menas is a computer and computer CRT.

16. The apparatus of claim 13 wherein said discrete digital storage device is a hard drive.

17. An apparatus for monitoring the long-term reliability condition of a running press, the press being operable over a range of load, speed, and die conditions and parameters, the apparatus comprising:
   vibration sensor means attached to the press for producing first electrical output signals indicative of the vibration produced in the press during operation;
   speed indicator means attached to the press for producing second electrical output signals indicative of the press running speed;
   means for processing said first and second electrical output signals; and
   means for displaying said first processed signals relative to said second processed signals, said first processed signals being displayed within one of a plurality of pregenerated eqivalent vibration level operating zones, whereby said displayed first processed signals indicates the long-term reliability condition of the press.

18. The apparatus of claim 17 wherein said vibration sensor means is an accelerometer.

19. The apparatus of claim 17 wherein a plurality of vibration sensors are attached to said press.

20. The apparatus of claim 19 wherein said plurality of vibration sensors are attached to a plurality of press locations.

21. The apparatus of claim 20 wherein said press locations are the press slide, bolster and stripper plate.

22. Apparatus of claim 17, wherein said display means is a precalibrated, color coded bar graph meter.

23. Apparatus of claim 17, wherein said display means is a precalibrated analog meter.

24. Apparatus of claim 17, wherein said display means is a precalibrated digital numeric display level.

25. Apparatus of claim 17, wherein said display means is a graphic chart of vibration level versus time for monitoring the accumulated historic vibration severity of the press.

26. The apparatus of claim 17, further comprising discrete digital storage means for storing said first and second output signals, said storage means in communication with said processing means.

27. The apparatus of claim 26 wherein said storage means is a computer.

28. Apparatus of claim 26, wherein said display means is a graphic chart of vibration level versus speed for any press/die application, for monitoring the reliability change which occurs on the press as the press/die speed is increased.

29. Apparatus of claim 26, in which said display means is a vibration severity graph which also shows present load/speed condition relative to said vibration severity zones.

* * * * *

UNITED STATES PATENT AND TRADEMARK OFFICE
CERTIFICATE OF CORRECTION

PATENT NO. : 5,094,107
DATED : March 10, 1992
INVENTOR(S) : Daniel A. Schoch It is certified that error appears in the above-identified patent and that said Letters Patent is hereby corrected as shown below:

Claim 15, Column 9, Line 57, delete "menas" and substitute therefor --means--.

Signed and Sealed this

Twenty-fifth Day of May, 1993

Attest:

MICHAEL K. KIRK

*Attesting Officer*      *Acting Commissioner of Patents and Trademarks*